US011117452B2

(12) United States Patent
Teufel et al.

(10) Patent No.: US 11,117,452 B2
(45) Date of Patent: Sep. 14, 2021

(54) DEVICE FOR A VEHICLE ROOF, AND METHOD FOR OPERATING A DEVICE FOR A VEHICLE ROOF

(71) Applicant: Webasto SE, Stockdorf (DE)

(72) Inventors: Ingo Teufel, Stockdorf (DE); Björn Pluciennik, Stockdorf (DE)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 16/764,032

(22) PCT Filed: Oct. 23, 2018

(86) PCT No.: PCT/EP2018/078992
§ 371 (c)(1),
(2) Date: May 14, 2020

(87) PCT Pub. No.: WO2019/110191
PCT Pub. Date: Jun. 13, 2019

(65) Prior Publication Data
US 2020/0346532 A1    Nov. 5, 2020

(30) Foreign Application Priority Data
Dec. 6, 2017    (DE) .......................... 102017129040.0

(51) Int. Cl.
*B60J 7/02* (2006.01)
*B60J 7/043* (2006.01)
*B60J 7/053* (2006.01)

(52) U.S. Cl.
CPC ................ *B60J 7/024* (2013.01); *B60J 7/043* (2013.01); *B60J 7/053* (2013.01)

(58) Field of Classification Search
CPC ... B60J 7/024; B60J 7/043; B60J 7/053; B60J 7/57; B60J 7/0435; E05D 15/1047; E05Y 2900/542
(Continued)

(56) References Cited

U.S. PATENT DOCUMENTS 4,609,222 A * 9/1986 Boots .......................... B60J 7/11
296/216.02
4,893,869 A    1/1990 Fuerst
(Continued)

FOREIGN PATENT DOCUMENTS

DE    8018732 U1    10/1980
DE    3735686 C1    12/1988
(Continued)

OTHER PUBLICATIONS

Lindner, "Patent Cooperation Treaty—International Preliminary Report On Patentability", dated Jun. 9, 2020, The International Bureau of WIPO, PCT/EP2018/078992 (Year: 2020).*
(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A device for a vehicle roof may have a guide element with a slideway, a bolt which can be displaced relative to the guide element and can be guided thereby on the slideway. The bolt and the guide element have a common contact area which may be formed by a protrusion on the bolt and the slideway, the protrusion being configured to introduce a corresponding notch into the slideway during the displacement along the slideway.

11 Claims, 5 Drawing Sheets

Figure 1:
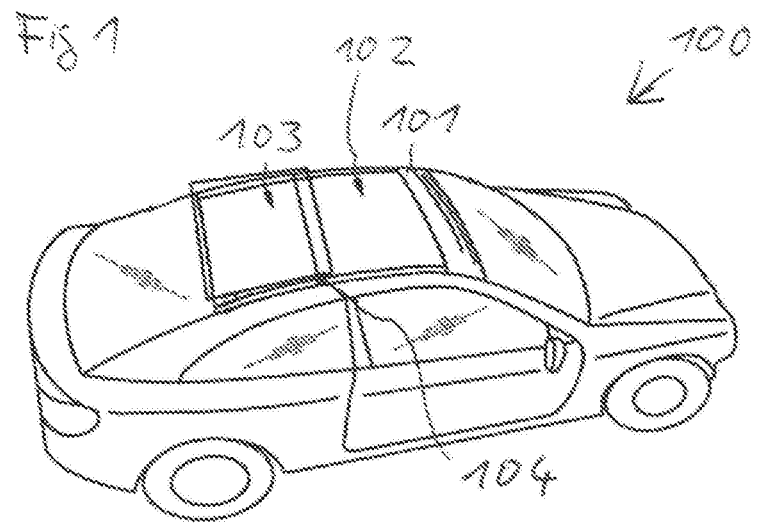

(58) Field of Classification Search
USPC ..... 296/216.02, 0.03, 0.04, 0.05, 0.08, 1.03, 296/146.15
See application file for complete search history.

(56) References Cited

U.S. PATENT DOCUMENTS

| | | | |
|---|---|---|---|
| 4,923,246 A | 5/1990 | Takahashi et al. | |
| 8,523,278 B2* | 9/2013 | Renaudin | B60J 7/0435 296/223 |
| 8,720,987 B2* | 5/2014 | Ohdoi | B60J 7/024 296/224 |
| 2001/0008347 A1* | 7/2001 | Ito | B60J 7/05 296/221 |
| 2004/0130187 A1* | 7/2004 | Friedrich | B60J 7/057 296/216.08 |
| 2007/0144303 A1 | 6/2007 | Sato et al. | |
| 2007/0145786 A1 | 6/2007 | MacNee, III et al. | |
| 2014/0175840 A1 | 6/2014 | Nabuurs et al. | |
| 2015/0084380 A1* | 3/2015 | Katsura | B60J 7/0084 296/213 |
| 2015/0130226 A1* | 5/2015 | Sawada | B60J 7/0435 296/216.03 |
| 2020/0130484 A1 | 4/2020 | Knopfle et al. | |

FOREIGN PATENT DOCUMENTS

| | | |
|---|---|---|
| DE | 10158174 A1 | 6/2003 |
| DE | 102004061376 A1 | 6/2006 |
| DE | 102006060084 A1 | 8/2007 |
| DE | 102017106510 A1 | 9/2018 |
| EP | 2727755 A1 | 5/2014 |
| JP | H06-000856 U | 1/1994 |
| JP | H08-156604 A | 6/1996 |
| JP | 2001-003630 A | 1/2001 |
| JP | 2004-106623 A | 4/2004 |
| JP | 2005-289329 A | 10/2005 |

OTHER PUBLICATIONS

Merriam-Webster, "definition of 'Introduce'", Jun. 24, 2021, https://www.merriam-webster.com/dictionary/introduce (Year: 2021).*
International Search Report for PCT/EP2018/078992 dated Feb. 11, 2019 in German and English (5 pages).
Office Action issued against corresponding JP Patent Application No. 2020-527731 dated Apr. 26, 2021 with English translation (6 pages).

* cited by examiner

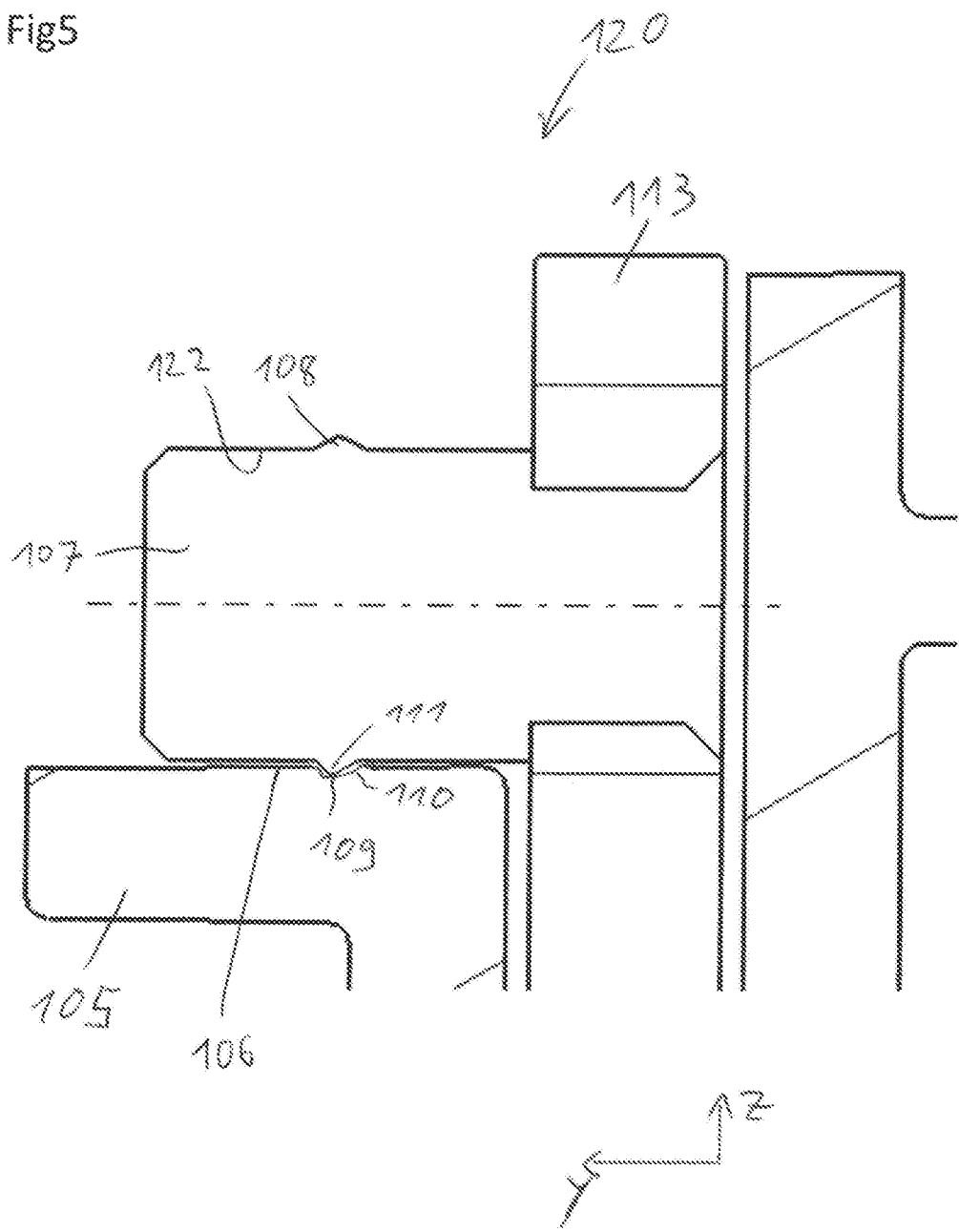

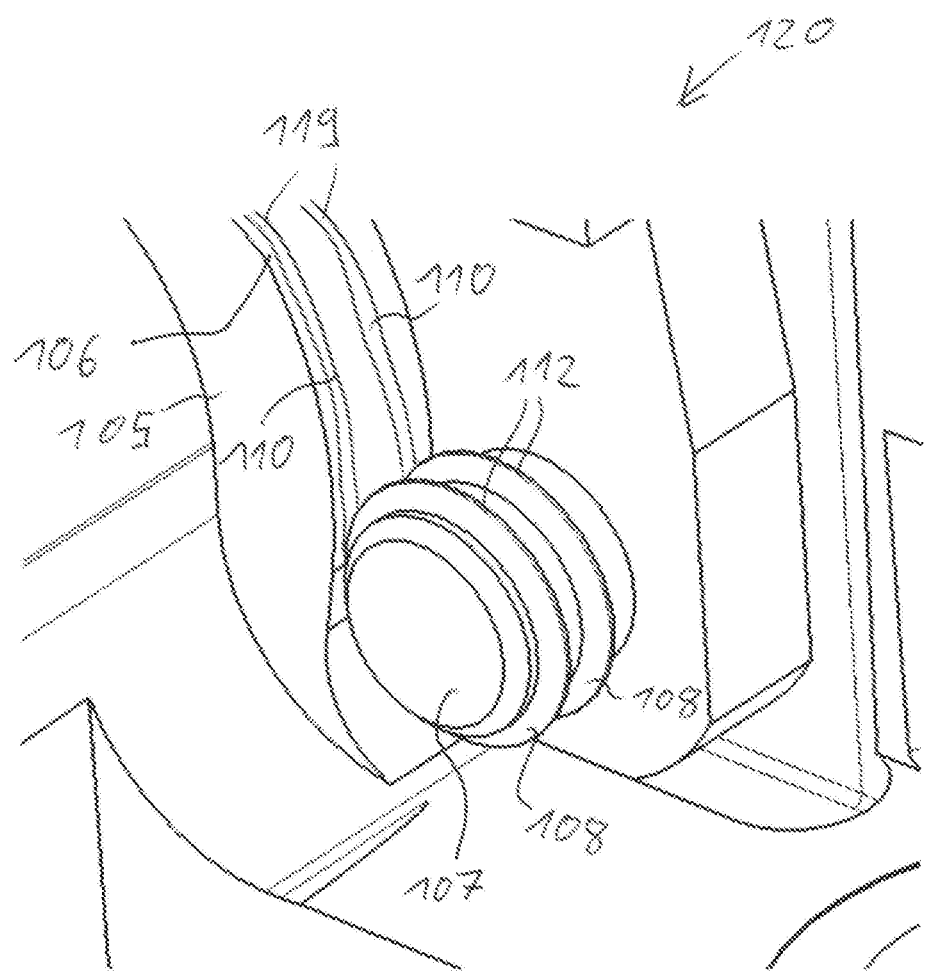

DEVICE FOR A VEHICLE ROOF, AND METHOD FOR OPERATING A DEVICE FOR A VEHICLE ROOF

CROSS-REFERENCE TO RELATED APPLICATIONS

This application is a U.S. national phase application filed under 35 U.S.C. § 371 of International Application No. PCT/EP2018/078992, filed 23 Oct. 2018, designating the United States, which claims priority from German Patent Application No. 10 2017 129 040.0, filed 6 Dec. 2017, which are hereby incorporated herein by reference in their entirety for all purposes.

FIELD

The invention relates to a device for a vehicle roof, in particular for a deployment mechanism of a cover for a roof opening in the vehicle roof.

BACKGROUND

The invention further relates to a method for operating a device for a vehicle roof.

Motor vehicles can have a roof opening which can be closed, and at least partially opened, by means of a movable cover. For this purpose, a cover mechanism is provided, which can also be referred to as a deployment mechanism. Such a mechanism for a spoiler roof is described, for example, in DE 10 2017 106 510.

It is desirable to specify a device for a vehicle roof, which makes reliable operation possible. It is also desirable to specify a method for operating a device for a vehicle roof, which makes reliable operation possible.

SUMMARY

According to at least one embodiment, a device for a vehicle roof has a guide element with a slideway. The guide element is for example part of a guide rail which can be assembled on the vehicle roof. The device has a bolt. The bolt can be displaced relative to the guide element and is guided thereby on the slideway. The bolt and the guide element have a common contact area which is formed by a protrusion on the bolt. The protrusion is configured to introduce a corresponding notch into the slideway during the displacement along the slideway. The bolt, which for example has a cylindrical main body, has the protrusion. This protrudes, for example, beyond the cylindrical main body. The protrusion protrudes 1 mm, 2 mm or 0.5 mm beyond the main body, for example. When the device is being used, the bolt can be displaced relative to the guide element. The guide element, in particular the slideway, and the bolt are arranged relative to one another such that the bolt, with the protrusion, can be displaced along the slideway and is in contact with the slideway in the process. The device is configured such that, particularly during the first use of the device or during a certain number of uses after the first use, for example during the first ten uses, the notch can be introduced into the slideway by means of the protrusion. The slideway is in particular initially substantially smooth and formed without the notch. Only as a result of the use of the device is the notch introduced into the slideway. After the notch has been formed, during further operation of the device, the bolt is guided with the protrusion in the notch.

On account of the formation of the notch by means of the protrusion on the bolt, play-free guidance of the bolt on the guide element is possible. Tolerances of the position of the bolt relative to the guide element are thus compensated. The protrusion and the slideway, which is configured such that the notch can be formed, have a tolerance-compensating effect. The bolt with the protrusion is easy to produce, for example in the form of a turned part or in the form of a milled part.

The play-eliminating effect of the bolt with the protrusion, in cooperation with the guide element with the slideway, is possible in a comparatively simple manner. The protrusion makes it possible to form the notch and thus to take as many tolerances of the device as possible into account as input variables. Only the protrusion, and not the bolt as a whole, forms the notch, for example. It is thus possible to realize smooth movement of the bolt when it is displaced relative to the guide element. The device thus makes it possible for the bolt and the guide element to be arranged relative to one another with as little play as possible and thereby enables smooth movement when the bolt and the guide element are displaced relative to one another. Noise emissions, for example as a result of rattling, can thus be avoided, and sluggishness can also thereby be avoided. A desired fit of the bolt and the guide element with respect to one another is set independently during the first use, or the initial uses, of the device. Simple tolerance design can thus be realized.

According to at least one embodiment, the protrusion is configured as an annularly circumferential rib. On the cylindrical bolt, the protrusion has the shape of a ring on the lateral surface of the bolt. Other shapes are also possible, for example an incomplete ring. By way of example, the protrusion is formed only on that part of the bolt which is in contact with the slideway during operation. According to further embodiments, a multiplicity of protrusions are formed on the bolt. By way of example, a plurality of protruding ribs are formed. The number of protrusions, the shape of the protrusions and the height of the protrusions is in particular selected such that a desired fit of the bolt and the guide element, with as little play as possible, is realized and the smoothness of the displacement is thereby maintained in a desired manner. By way of example, the rib is configured, in cross section, in the form of a triangle, in the form of a cylinder stub or in the form of a segment of an oval.

According to at least one embodiment, the protrusion is formed of a harder material than the slideway. By way of example, the protrusion is formed of a metal, for example steel and/or aluminum. By way of example, the slideway is formed of a plastic, which is softer than the metal of the protrusion. The guide element in particular comprises the plastic at the location where the slideway is formed. The plastic is for example a polymer. The situation whereby the protrusion is able to form the notch in the slideway can thus be reliably realized.

According to at least one embodiment, the bolt is part of a deployment lever. The deployment lever is for example part of a cover mechanism for a cover for the vehicle roof. A movement of the deployment lever counter to a first direction relative to the guide element can be blocked by means of the bolt and the slideway. By way of example, in a first state, for the purposes of folding out the deployment lever, the bolt can be displaced along the slideway. The slideway is shaped such that, in the deployed state of the deployment lever, a displacement counter to the first direction relative to the guide element is blocked on account of the abutment of the bolt against the slideway. By way of example, to this end, the slideway has a substantially vertical orientation in certain portions.

According to at least one embodiment, in an initial state, the protrusion has an oversize with respect to the slideway. In the initial state, the notch has not yet been introduced into the slideway.

According to at least one embodiment, in a ready-for-operation state, the notch has been formed, in particular by a first use, or multiple uses, of the device. The common contact area is formed by the protrusion and the notch on the slideway. The main body of the bolt and the slideway are, for example, spaced apart from one another during operation. The protrusion is guided in the slideway and the bolt is thus in contact with the slideway by means of the protrusion.

Directly after the production of the guide element, the notch has not been formed. The notch is formed during operation.

According to at least one embodiment, the vehicle roof has a roof opening. The roof opening can be closed by means of a cover. The cover is fastened to the vehicle roof by means of the cover mechanism and can in particular be displaced relative to the rest of the vehicle roof. The cover mechanism has a device according to at least one embodiment.

According to at least one embodiment, a method for operating a device for a vehicle roof is specified, in particular a method for operating the device according to at least one embodiment as described. The method comprises provision of a guide element with a slideway and provision of a bolt with a protrusion. The bolt is displaced along the slideway. During the displacement, the protrusion is in contact with the slideway. As a result, a notch is formed in the slideway, said notch corresponding to the protrusion.

The features and advantages elucidated in relation to the device also apply in particular to the method, and vice versa. By means of the method, it is possible to form the notch in the slideway only during the first operation or during a certain number of uses after the first operation. A fit of the bolt and the guide element to one another with as little play as possible is thus made possible. The slideway is initially smooth and formed in particular without the notch. During the displacement of the bolt along the slideway, the protrusion forms the notch into the slideway. In particular, the bolt and the guide element are arranged with an oversize with respect to one another, such that the protrusion is pushed into the slideway. The fact that the notch is formed only when the method is being performed results in a tolerance-compensating effect for tolerances of the bolt and of the guide element and also of the arrangement of the bolt and the guide element with respect to one another.

According to at least one embodiment, the method comprises displacement of a deployment lever along a first direction relative to the guide element during the displacement of the bolt. The deployment lever is for example part of a cover mechanism. The bolt is for example fastened to the deployment lever and the deployment lever is held by the guide element. The bolt is moved relative to the slideway into a blocking position. In the blocking position, the bolt, together with the slideway, blocks a movement of the deployment lever counter to the first direction relative to the guide element.

Further advantages, features and developments emerge from the following examples which are elucidated in conjunction with the figures. Elements which are identical, similar or have an identical effect can be provided therein with the same reference designations.

BRIEF DESCRIPTIONS OF THE DRAWINGS

Figure 2:
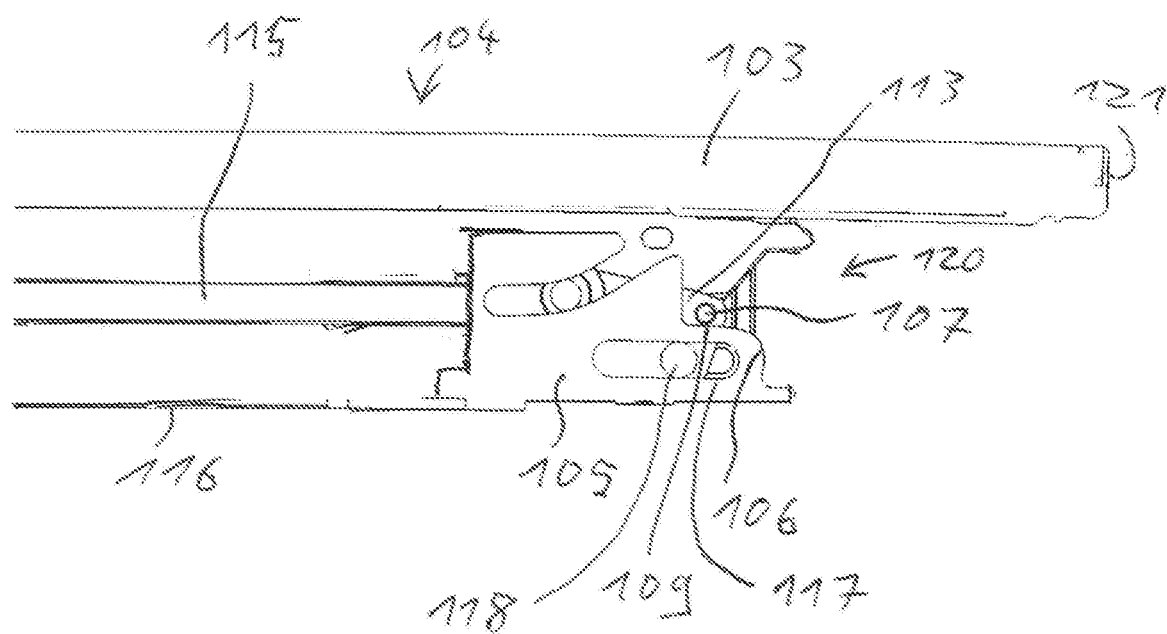
Figure 3:
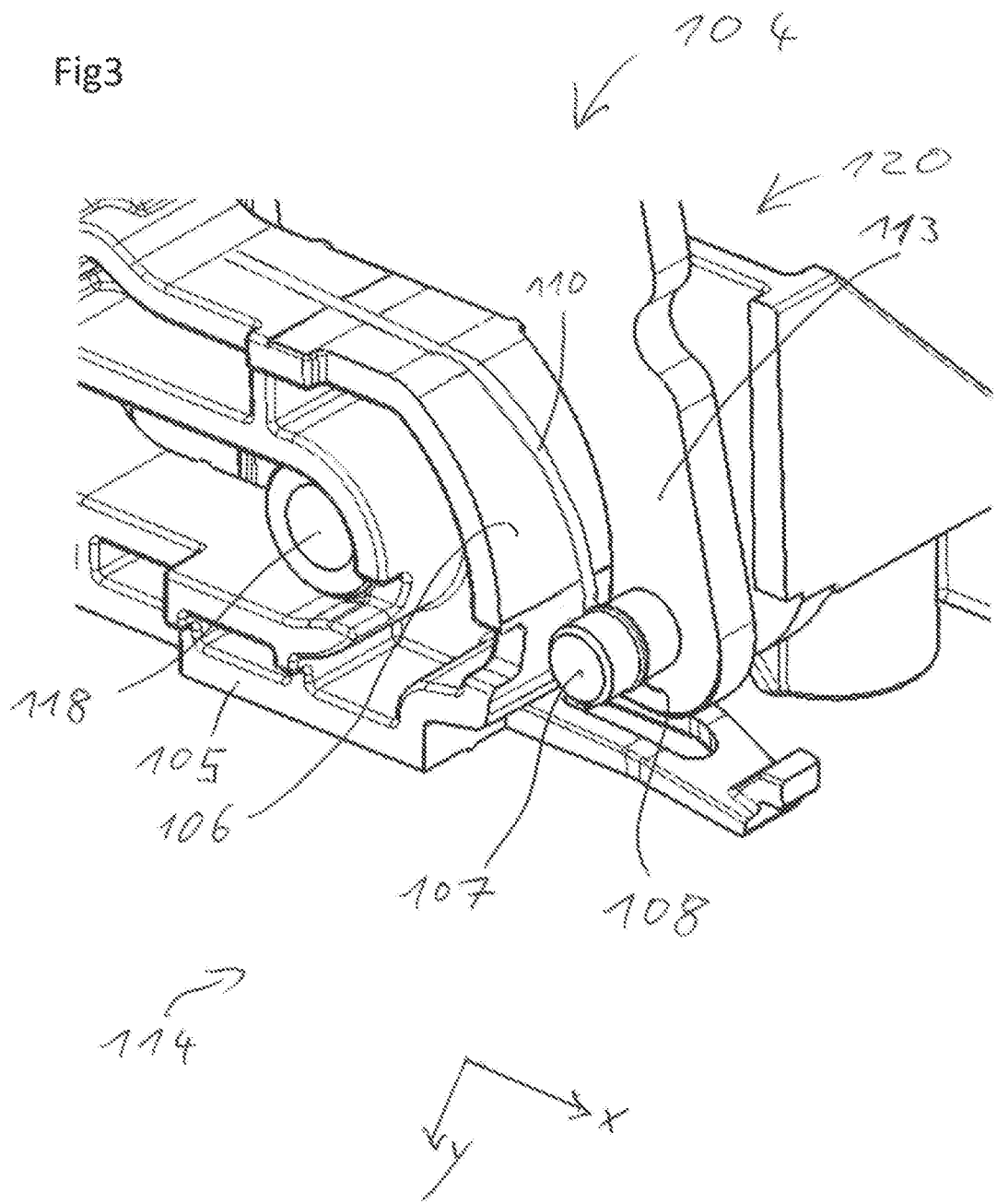
Figure 4:
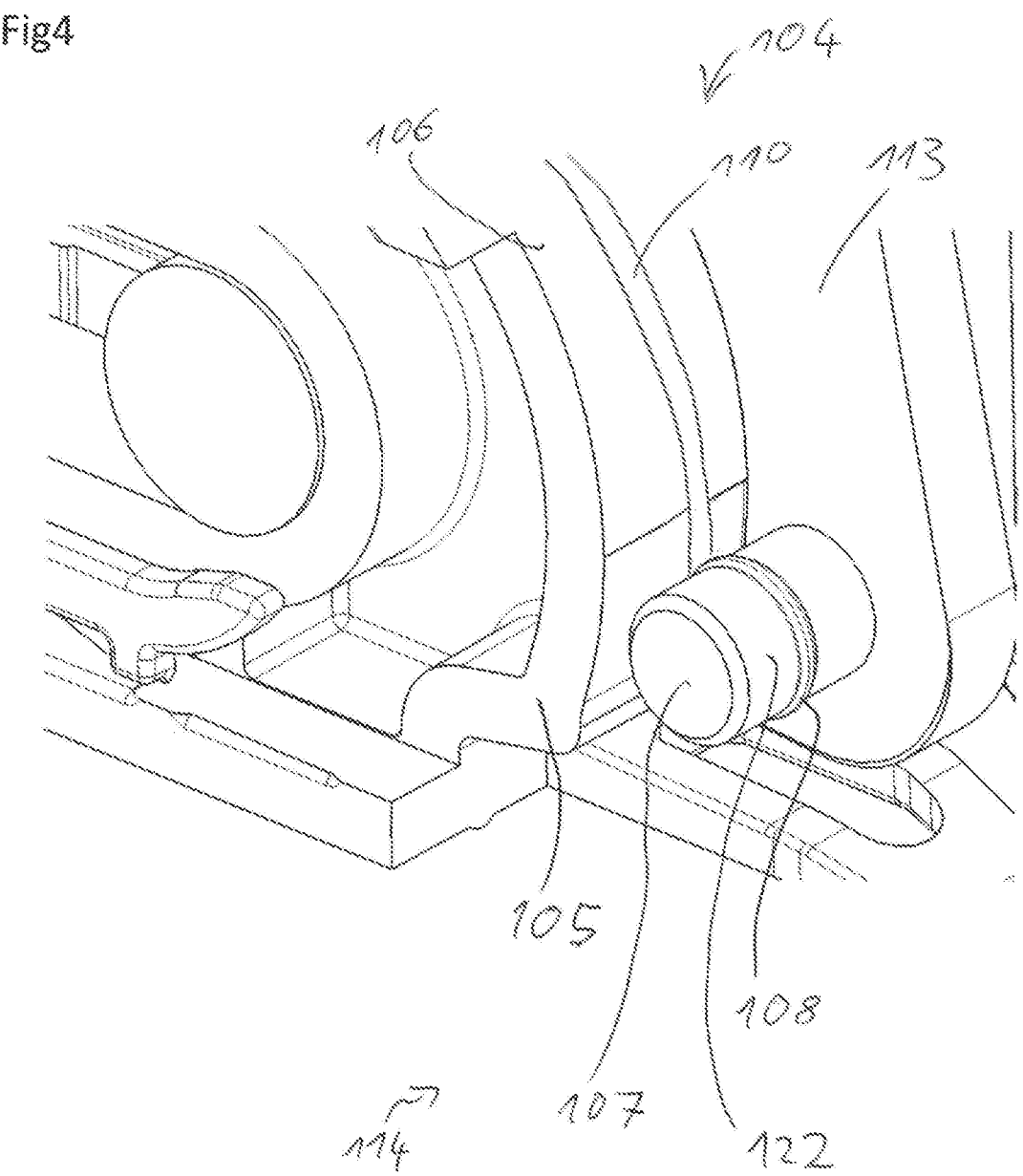

In the drawings:

FIG. 1 shows a schematic illustration of a vehicle according to an exemplary embodiment, FIG. 2 shows a schematic illustration of a part of a cover mechanism according to an exemplary embodiment, FIG. 3 shows a schematic illustration of a part of a cover mechanism according to an exemplary embodiment, FIG. 4 shows a schematic illustration of a part of a cover mechanism according to an exemplary embodiment, FIG. 5 shows a schematic illustration of a sectional view of a device according to an exemplary embodiment, and FIG. 6 shows a schematic illustration of a device according to an exemplary embodiment.

DETAILED DESCRIPTION

FIG. 1 shows a schematic illustration of a vehicle 100. The vehicle has a vehicle roof 101. A roof opening 102 is formed in the vehicle roof 101. The roof opening 102 can either be closed or at least partially opened by means of a displaceable cover 103. By way of example, the cover 103 is part of a so-called spoiler roof. A spoiler roof is described, for example, in DE 102014109698.

Along an X direction, which extends along a first direction, for example the vehicle longitudinal direction, guide rails 116 (FIG. 2) are arranged on both sides of the roof opening 102. The cover 103 is held on the vehicle roof 102 by means of a cover mechanism 104 and the guide rails 116. The cover mechanism 104 and the guide rail 116 also control and guide the movement of the cover 103 relative to the rest of the vehicle roof 101. A device 120 according to the application is elucidated below with reference to one side of the roof opening 102. The opposite side is constructed correspondingly thereto.

FIG. 2 shows a rear edge 121 of the cover 103 with the associated device 120, said rear edge being arranged, along the X direction, at the rear end. The device 120 is part of the cover mechanism 104.

The cover mechanism 104 for example has a deployment rod 115 which is coupled to a drive of the cover mechanism 104. The deployment rod 115 transmits a movement of the drive onto a deployment lever 113. The deployment lever 113 is provided in order to move the rear edge 121 of the cover 103 along the Z direction.

The guide rail 116, at the rear end thereof in the X direction, has a guide element 105. The guide element 105 is in particular formed of a plastic. The guide element 105 has in particular plastic which is for example reinforced, for example by metal.

The deployment lever 113 is coupled to the guide element 105 and is in particular held by the guide element 105. The deployment lever 113 has a bolt 107 and a further bolt 118, which each extend mainly along the Y direction in the ready-for-operation state. The further bolt 118 of the deployment lever 113 is arranged, and guided, in a slotted guide 117 of the guide element 105. A movement of the deployment lever 113 relative to the guide element 105 is thus possible along the X direction. In order to move the rear edge 121 of the cover 103, the deployment lever 113 is moved both in translation along the X direction and in rotation about an axis of rotation, which is prescribed by the further bolt 118.

In this case, the bolt 107 is arranged, and guided, on a slideway 106 of the guide element 105. A cover mechanism of this kind is elucidated, for example, in DE 102017106510, which is mentioned in the introduction.

FIG. 3 shows a part of the cover mechanism 104 in the deployed position of the deployment lever 113. The deployment lever 113 has been pivoted, in order to raise the rear edge 121 of the cover 103 in the Z direction in comparison to the closed position of the cover 103.

In comparison to the position which is illustrated in FIG. 2, the bolt 107 has been displaced along the slideway 106. In FIG. 3, the bolt 107 is located in the blocking position 114 thereof relative to the slideway 106. The slideway 106 is shaped such that, in the deployed position of the deployment lever 113, a movement of the deployment lever 113 counter to the X direction is blocked by the contact of the bolt 107 with the slideway 106. In the deployed position of the deployment lever 113, a displacement of the deployment lever 113 relative to the guide element 105 along the X direction is blocked by the further bolt 118, in cooperation with the slotted guide 117, and by the bolt 107, in cooperation with the slideway 106.

The bolt 107 has a protrusion 108. The bolt 107 has a lateral surface 122 (FIG. 4), which is for example substantially concentric with respect to the Y direction. The protrusion 108 is for example arranged in the shape of a ring on the lateral surface 122 of the bolt 107 and is likewise concentric with respect to the Y direction.

The slideway 106 has a notch 110. The notch 110 corresponds to the protrusion 108 of the bolt 107. During the movement of the bolt 107 along the slideway 106, the protrusion 108 is guided in the notch 110.

FIG. 4 shows the device 120 of FIG. 3 in detail. The lateral surface 122 of the bolt 107 is arranged at a spacing from the slideway 106. In the notch 110, merely the protrusion 108 is in contact with the slideway 106. It is thus made possible for the bolt 107 to be moved smoothly relative to the guide element 105.

The notch 110 is introduced into the slideway 106 by means of a movement of the bolt 107 relative to the slideway 106. The protrusion 108 deforms the material of the guide element 105 on the slideway 106, such that the notch 110 is formed. By way of example, the protrusion 108 deforms the slideway 106 in order to form the notch 110.

The guide element 105 is produced with the slideway 106 initially without the notch 110. The device 120 is assembled, as illustrated in FIG. 2, for example. In particular, the guide element 105 and the bolt 107 are designed, and arranged relative to one another, such that the protrusion 108 and the slideway 106 have an oversize with respect to one another. The protrusion 108 is pushed into the slideway 106. During the pivoting of the deployment lever 113 and thus during the sliding of the bolt 107 along the slideway 106, the notch 110 is formed on account of the pressing of the protrusion 108 into the slideway 106. By means of the protrusion 108, the bolt 107 forms its guideway, in the form of the notch 110, into the slideway 106 in a manner free of play. Tolerances in the device 120 are thus compensated.

In particular, tolerances which, in the blocking position 114, could lead to the occurrence of a spacing between the slideway 106 and the bolt 107 are compensated. This spacing can lead to rattling and thus to noise emissions. This is compensated for by the protrusion 108, which forms the corresponding notch 110 thereof itself and thus is free of play. A defined overlap of the protrusion 108 with respect to the slideway 106 makes it possible both for the relative movement of the bolt 107 along the slideway 106 to be smooth and for the notch 110 to be formed in a tolerance-compensating manner. The notch 110 can also be referred to as a groove.

FIG. 5 shows a sectional view of the device 120. The lateral surface 122 of the bolt 107 is spaced apart from the slideway 106. The protrusion 108 is for example configured as a circumferential rib 111 on the lateral surface 122. In the view which is shown, the protrusion 108 protrudes along the Z direction beyond the lateral surface 122. The protrusion 108 protrudes transversely with respect to the main extent direction beyond the lateral surface 122. The main extent direction is for example the Y direction. The rib 111 can have different shapes, depending on the desired movement smoothness and/or other boundary conditions. By way of example, the rib 111 is configured as a V-ring. Another shape is also possible, for example the shape of a segment of a circle, a polygonal shape and/or a combination of various shapes. In the notch 110, the protrusion 108, for example the rib 111, is in contact with the slideway 106. In the notch 110, the protrusion 108 and the slideway 106 have a common contact area 109. Since the notch 110 is formed by the protrusion 108, the notch 110 is configured, in cross section, such that it corresponds to, and fits with, the protrusion 108.

FIG. 6 shows the device 120 according to a further exemplary embodiment. The device 120 corresponds substantially to the hitherto described device 120. In contrast, a multiplicity 112 of protrusions 108 are provided. Correspondingly, a multiplicity 119 of notches 110 are provided. In the exemplary embodiment which is illustrated, the bolt 107 has two protrusions 108. Correspondingly, two notches 110 are formed on the slideway 106. According to further exemplary embodiments, more than two protrusions 108 are formed. The play-eliminating effect is for example adjusted to a desired smoothness of the movement by the number of protrusions 108 on the bolt 107. As an alternative or in addition, the play-eliminating effect is adjusted to a desired movement smoothness by the dimensioning of the protrusion 108 or of the protrusions 108. As an alternative or in addition, the play-eliminating effect is adjusted to the desired movement smoothness by the shape of the protrusion 108 or of the protrusions 108.

The device 120 makes it possible, in particular in the blocking position 114, for the tolerances between the bolt 107 and the guide element 105 to be compensated for. The protrusion 108 acts as a tolerance-compensating feature. By using the protrusion 108 itself to form the notch 110, the device 120 is free of play. The elimination of play has a tolerance-compensating effect. Simple production of the device 120 is made possible by the arrangement of the protrusions 108 on the bolt 107.

As an alternative or in addition, it is also possible to form a protrusion on the slideway. However, according to exemplary embodiments, the protrusion 108 on the bolt 107 is easier to produce. The slideway 106 is also deformed or plastically deformed only at certain points by means of the protrusion 108 on the bolt 107. It is thus possible to realize a relatively low risk of wear and settling.

As an alternative or in addition to the described exemplary use on the deployment lever 113, the device 120 can also be used, in general, with the bolt 107 which is guided along the slideway 106, for example a slotted guide track. By way of example, the protrusion 108 is used on a bolt which is longitudinally movable relative to a slotted guide track, for example with a control rod and/or an actuating lever of a mechanism for moving a cover relative to a vehicle roof.

The device 120 makes possible a design with overpressure action on the protrusion 108. The local overpressure action only on the protrusion 108 has a small influence on the smoothness or sluggishness of the movement. The protrusion 108 digs into the plastic of the slideway 106 and thus, during the first use, independently forms a fit which is as optimal as possible. Simple tolerance design between the bolt 107 and the slideway 106 is thus possible.

The invention claimed is:

1. A device for a vehicle roof, comprising:
a guide element with a slideway,
a bolt which can be displaced relative to the guide element and is guided thereby on the slideway,
the bolt and the guide element having a common contact area which is formed by a protrusion on the bolt and the slideway, the protrusion being configured to introduce a corresponding notch into the slideway during the displacement along the slideway.

2. The device according to claim 1, wherein the protrusion is configured as an annularly circumferential rib.

3. The device according to claim 1, wherein a multiplicity of protrusions are formed on the bolt.

4. The device according to claim 1, wherein the protrusion is formed of a harder material than the slideway.

5. The device according to claim 1, wherein the protrusion is composed of a metal and the slideway is composed of a plastic.

6. The device according to claim 1, wherein the bolt is part of a deployment lever, and a movement of the deployment lever counter to a first direction (X) relative to the guide element is blockable by the bolt and the slideway.

7. The device according to claim 1, wherein, in an initial state, the protrusion has an oversize with respect to the slideway.

8. The device according to claim 1, wherein the notch has been formed by the protrusion.

9. A vehicle roof with a roof opening which can be closed by a cover, the cover being fastened to the vehicle roof by a cover mechanism, the cover mechanism having a device according to claim 1.

10. A method for operating a device for a vehicle roof, comprising:
providing of a guide element with a slideway and of a bolt with a protrusion,
displacing the bolt along the slideway, the protrusion being in contact with the slideway, and, as a result, and
forming of a notch in the slideway, said notch corresponding to the protrusion.

11. The method according to claim 10, comprising:
displacing of a deployment lever along a first direction (X) relative to the guide element during the displacement of the bolt, the bolt being fastened to the deployment lever and the deployment lever being held by the guide element,
moving the bolt relative to the slideway into a blocking position, and, as a result,
blocking of a movement of the deployment lever counter to the first direction (X) relative to the guide element.

* * * * *